United States Patent [19]

Conte

[11] 4,281,354
[45] Jul. 28, 1981

[54] APPARATUS FOR MAGNETIC RECORDING OF CASUAL EVENTS RELATING TO MOVABLE MEANS

[76] Inventor: Raffaele Conte, Via S. Barnaba 30, Milano, Italy

[21] Appl. No.: 40,036

[22] Filed: May 17, 1979

[30] Foreign Application Priority Data

May 19, 1979 [IT] Italy .............................. 23605 A/78

[51] Int. Cl.³ .............................................. H04N 7/18
[52] U.S. Cl. ........................................ 360/5; 358/105
[58] Field of Search ..................... 358/105, 108; 360/5

[56] References Cited

U.S. PATENT DOCUMENTS

| 3,686,434 | 8/1972 | Lemelson | 358/105 X |
| 3,740,466 | 6/1973 | Marshall et al. | 358/105 |
| 3,812,287 | 5/1974 | Lemelson | 358/105 |
| 3,885,090 | 5/1975 | Rosenbaum | 358/105 X |
| 3,924,130 | 12/1975 | Cohen et al. | 358/105 X |

FOREIGN PATENT DOCUMENTS

| 2144953 | 9/1971 | Fed. Rep. of Germany |  |
| 2082432 | 3/1970 | France |  |
| 1106339 | 3/1968 | United Kingdom | 358/108 |

OTHER PUBLICATIONS

Stillman et al., "Development of a Traffic Flow Sensing and Surveillance System", 1967, IEEE Automotive Conference Record, Detroit, Michigan, Sep. 21, 22, pp. 1–3.

Winters, "Photo Surveillance", 1969 Carnahan Conference on Electronic Crime Countermeasures, University of Kentucky, Apr. 24–26, p. 22.

Buchanan et al., "Signal processing capabilities of a 100×100 CCD array", 1975, International Conference on the Application of Charge-Coupled Devices, San Diego, Calif. USA 10/29–31/75, pp. 209–215.

*Primary Examiner*—Alfred H. Eddleman
*Assistant Examiner*—Donald McElheny, Jr.
*Attorney, Agent, or Firm*—Fidelman, Wolffe & Waldron

[57] ABSTRACT

The invention consists of an apparatus for recording accidental events relating to movable devices such as automotive vehicles, which events can be sensed by optical observation, and comprises: detecting means for receiving the images of the event and transforming them into electric signals; a signal storing circuit comprising one or more analog memories, wherein the recording of successive events is carried out by automatically erasing the oldest image; and sensor means for assuring automatic interruption of the incoming signal flow from the image detecting means to the memories to achieve the automatic nonerasable storage of images corresponding to a predetermined period immediately preceding and contemporary to the accidental event.

5 Claims, 2 Drawing Figures

APPARATUS FOR MAGNETIC RECORDING OF CASUAL EVENTS RELATING TO MOVABLE MEANS

BACKGROUND OF THE INVENTION

This invention is concerned with the recording of events, such as accidents, that may occur in marine, air, or land travels. Each situation or event which is a cause of debate or has criminal implications should, as far as possible, be collated with a photographic type of documentation capable of providing a visual record of the event suitable to promote the verification of its causes and development, independently of the unsubstantiated opinions of possible witnesses. The character of accidents and other unforeseen events causes the acquisition of the relative documentation to be highly onerous.

For example, a scrupulous motorist wishing to support his own correctness or another's fault in a road accident, could mount a motion-picture camera on his own car and continuously film the confluent zones or roads so as to record the instants that precede any accident. Such a procedure would have a very high operating and servicing cost due to the need of replacing the film being exposed.

BRIEF SUMMARY OF THE INVENTION

It is an object of the present invention to provide an apparatus for the documentation of an accidental event at an extremely low operating cost.

To this end, provision is made for the use of detecting means for assuring visual recording of accidental events when they occur around the movable means (i.e., vehicle) accommodating the apparatus. The movable means can be provided with a plurality of television cameras in connection with a single recording device suitable to select the signals to be recorded or in connection with as many independent recording devices as there are cameras. A signal storing circuit comprising one or more analog memories capable of retaining the electric signals from said detecting means (television cameras) may be used in which the oldest signal in memory is erased at each arrival of a new signal. A sensor means is used to automatically halt the storing of images upon the occurrence of an accident, preventing the erasure of the images in memory which correspond to a predetermined period immediately prior to the accidental event. It is also contemplated that these images may be transmitted from the memories to a magnetic tape recorder for a permanent video record of the event.

A preferred embodiment also provides means for connecting the recorder with a standard monitor so that the user may immediately see the image recorded on the tape and so that the user may make a recurrent check of the apparatus.

The number or capacity of the memories to be used may vary according to the length of turn-around time that the manufacturer wishes to provide.

In the case of road accidents, the class of occurrences for which it appears that the invention has larger and more useful possibilities of use, it is an item of common knowledge that such events occur in a very short time, corresponding to a few fractions of a second. Accordingly, a small memory turn-around time would suffice. The possibility of a visual review of the accident and the events preceding the accident appears largely assured if the memories provide for a recording duration of a few seconds.

The present invention will be more clearly understood from the following detailed description, given by way of unrestrictive example, with specific reference to the drawings.

DETAILED DESCRIPTION OF THE DRAWINGS

Figure 1:
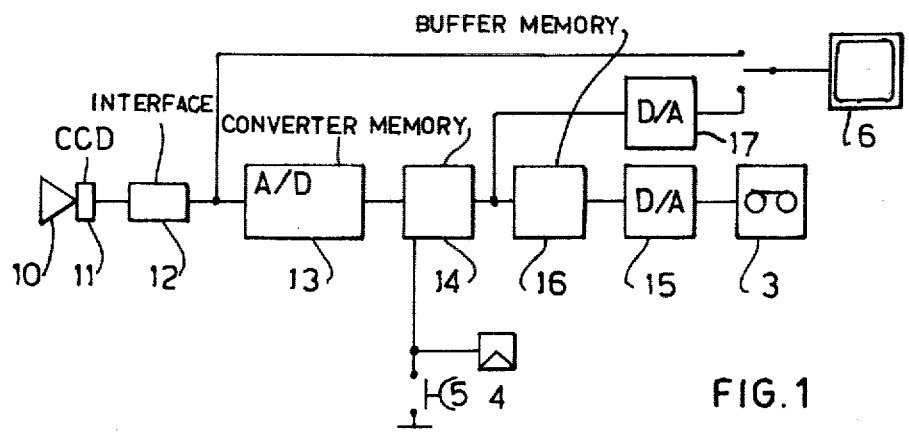
FIG. 1 is a block diagram of the apparatus, with a single television camera.

With reference to FIG. 1, a lens 10 is provided for focusing the images of the environment surrounding the vehicle onto a charge coupled device (CCD) indicated at 11. In a practical embodiment of the invention, a Fairfield CD 202 type CCD has been used.

The image focused on CCD 11 is sent to an interface device 12, according to the specifications of the manufacturer of the CCD device.

The lens 10, CCD device 11, and interface device 12 together form a television camera. This arrangement is suitable for easily synchronising the rest of the apparatus.

The output of interface 12 is sent to an analog/digital converter 13 which, in this specific embodiment, is of the three bit type carried out with discrete components. The digital output is storable on normal erasable memories. As an example, CCD-type memories have been used (in particular, the TMS 3604 of the Texas Instruments Corp.), which are preceded from a static type buffer memory for regulating the signal flow from the A/D converter to the CCD memory. These CCD memories are the continuous loop type; when their maximum data capacity has been reached, storage will be continuous by erasing the oldest image contained in the memory and replacing it with the newest image.

The loop memory is controlled by a sensor 4 which feels every driving anomaly, sudden deceleration, sudden stop, impact, abnormal deviation and the like, of the movable means supporting the apparatus. Various types of sensors are readily available to perform this function.

Sensor 4 stops the storage of images in the memory while, at the same type, stopping the erasure of the oldest image already stored. Thus, in this memory, the series of images corresponding to the last predetermined period preceding and contemporary to the accidental event will be retained. Obviously, the number of images stored may vary, depending on the quantity and capacity of memories used.

Having stopped the erasure of memory by sensing a driving anomaly such as a swerve or jolt, this memory (with its energy feed) may be presented to a judge for review of the stored images by means of a D/A converter and a normal video monitor. Thus, cinematographic evidence of the event may be preserved.

An improvement of the invention consists in connecting a device to memories 14 for permanent recording of the stored images. In particular, a D/A converter 15 could be connected to a normal tape recorder 3, with a buffer memory 16 providing a signal flow velocity interfacing.

Another embodiment consists in directly storing the digital signals coming from the buffer memory 16 in a tape recorder by means of one of the known techniques.

A further embodiment foresees that the vehicle may include a small monitor 6 which can receive the real images not yet stored directly into memory from the interface 12. In this way, the operator of the vehicle can check the operation of the television camera. The stored images from the memory 14 also could be sent through a D/A converter 17, to the monitor. Additionally, the monitor 6 can be connected selectively to a recorder as shown in FIG. 2, by means of switches (not shown).

Figure 2:
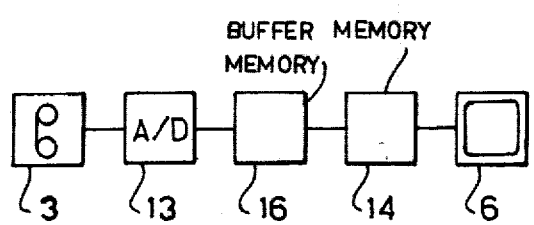
FIG. 2 is a block diagram of a device capable of displaying, on a monitor, the images stored in a tape recorder.

The arrangement of Fig. 2 includes A/D converter 13, buffer memory 16, main memory 14 and monitor 6—all the necessary apparatus for viewing the tapes outside the vehicle. If tape 3 is recorded by a digital technique, then A/D converter 13 is eliminated.

The starting of recorder 3, and the stopping of the storing function of memory 14 may also be accomplished by a pushbutton 5 which is operable by the user whenever he wishes to record events other than those which cause the reaction of sensor 4. Successive viewing on the monitor 6 of the images recorded on tape 3 may be caused by the user on operation of another pushbutton (not shown).

The two functions performed by memory 14, signal reception and transmission, are inconsistent with each other. Therefore, as above mentioned, as the function of signal transmission to recorder 3 (caused by sensor 4 or pushbutton 5) is started, continuation of the signal reception function of memory 14 from the television cameras is halted. This feature prevents the erasure of useful images, that is, images relating to the accident, through superimposition of successive useless images not relating to the involved accident. Therefore, it is assured that the tape recording relates only to the moments immediately preceding and contemporary to the accident. According to one of the many possible arrangements and combinations, a plurality of cameras and storing means can be provided and connected to a single magnetic recorder by means of an automatic selector (not shown).

I claim:

1. An apparatus for video surveillance of the environment about a vehicle, said apparatus comprising:
   (a) scanning means, mountable on said vehicle, for scanning said environment and converting images of said environment to electric signals;
   (b) storage means for receiving and storing said signals, said storage means having a specific storage capacity and being adapted to update stored signals when said storage capacity is full, whereby said updating is effected by superposition of newly received signals upon the oldest stored signals to thereby erase said oldest stored signals; and
   (c) Sensor means, mountable on said vehicle, for sensing specified changes in travel of said vehicle and, in response to said sensed changes, automatically preventing said updating of said storage means to provide fixed storage signals.

2. An apparatus as in claim 1, wherein said apparatus further includes a manual control means for preventing said updating and providing said fixed storage signals.

3. An apparatus as in claim 2, wherein said apparatus further includes a video monitor adapted to receive said fixed storage signals for video monitoring of said images.

4. An apparatus as in claim 1, wherein said apparatus further includes a recording means for receiving said fixed storage signals to provide a record of said fixed storage signals.

5. An apparatus as in claim 4, wherein said record is adapted to be fed to a monitoring means for video monitoring of said images.

* * * * *